Dec. 26, 1961 G. A. MALEY 3,015,043

TRIGGER WITH THREE STABLE STATES

Filed Dec. 29, 1959 3 Sheets-Sheet 1

(CONDITION 1)

(CONDITION 2)

INVENTOR
GERALD A. MALEY

BY *Mitchell & Bechert*

ATTORNEYS

Dec. 26, 1961 G. A. MALEY 3,015,043

TRIGGER WITH THREE STABLE STATES

Filed Dec. 29, 1959 3 Sheets-Sheet 2

(CONDITION 3)

(CONDITION 4)

TRIGGER WITH THREE STABLE STATES

Filed Dec. 29, 1959

(CONDITION 5)

(CONDITION 6)

United States Patent Office 3,015,043
Patented Dec. 26, 1961

3,015,043

TRIGGER WITH THREE STABLE STATES

Gerald A. Maley, Poughkeepsie, N.Y., assignor to International Business Machines Corporation, New York, N.Y., a corporation of New York Filed Dec. 29, 1959, Ser. No. 862,678
8 Claims. (Cl. 307—88.5)

This inveniton relates to pulse-operated circuit systems, and more particularly to a pulse-operated trigger circuit having three stable states.

In the computer field, three-stage closed ring devices are often employed. With the introduction of transistors to the computer, certain difficulties have arisen because of the inability of driving one transistor by another like transistor. For example, if we assume a three-stage transistor ring comprising a PNP transistor in the first stage, an NPN in the second stage and a PNP in the third stage, the closed ring would be inoperable because the third stage, which is PNP, cannot drive the first stage, which is also a PNP transistor. It is well known that in order to provide proper driving signals in multistage transistor circuits, a complementary transistor type is required in each succesive stage.

Accordingly, it is a primary object of this invention to provide a three stable state (tri-stable) trigger device which is eminently suited for use as a three-stage closed ring.

It is a further object of the invention to provide a tri-stable trigger utilizing only AND and OR circuit blocks.

In accordance with a broad aspect of the invention, there is provided a tri-stable pulse-operated circuit system comprising a plurality of pulse input circuits, an output circuit and intermediate control circuits between the input and output circuits controlled by the input circuits. The invention is characterized by the control circuits being responsive to applied pulses for selectively conditioning the input circuits for further response to applied pulses and for rendering the output circuits effective upon application of a predetermined number of pulses to the input circuits.

In accordance with a more limited aspect of the invention, the input and output circuits comprise AND circuit blocks and the control circuits comprise OR circuit blocks.

Figure 6:
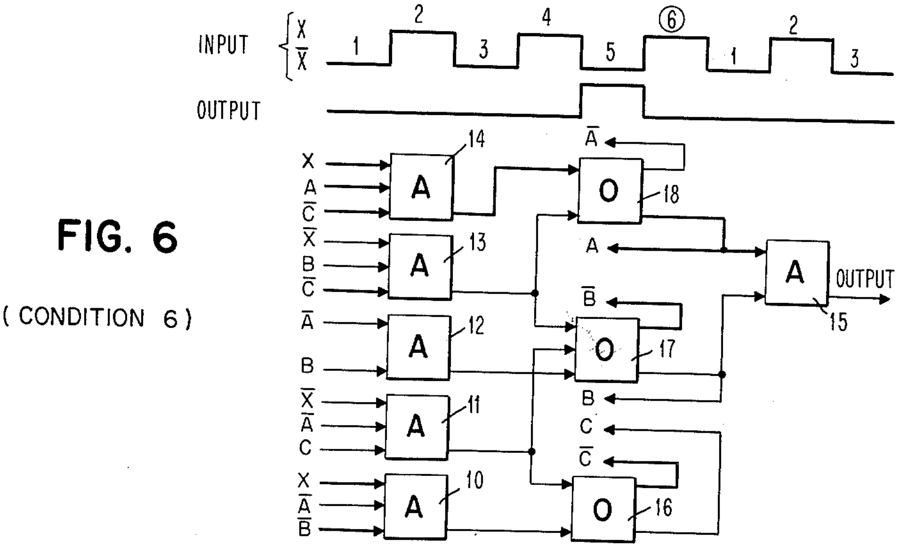
Figure 7:
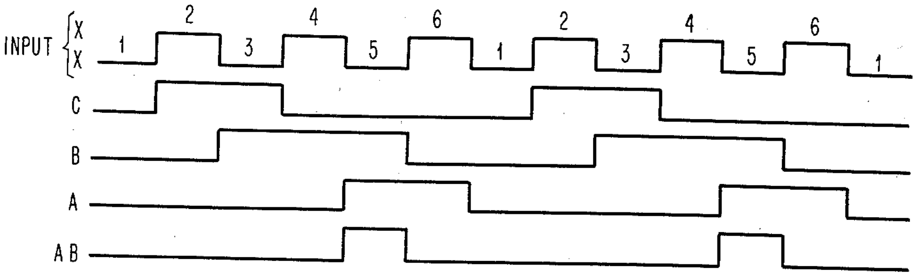

The above-mentioned and other features and objects of this invention and the manner of attaining them will become more apparent and the invention itself will be best understood by an embodiment of the invention taken in conjunction with the accompanying drawing, wherein:

FIGS. 1–6 are block diagrams of the novel circuit, showing, respectively, successive conditions of the circuit upon application of consecutive pulses; and FIG. 7 is a chart showing the condition of input lines upon application of consecutive pulses.

Logic blocks, such as AND circuits and OR circuits, are now well known in the computer field, and in the interest of simplicity, no explanation of these circuits is given herein. For a detailed discussion of such circuits, reference may be had to text books and patents in which details of such circuits are explained.

In the explanation of the operation of the circuit, standard Boolean algebraic notations will be employed. For example, an arrow pointing toward a block indicates an input, and a letter, for example A, is an arbitrary designation for an input derived from a particular undescribed source, which may be another logic block. A similar arrow with the letter designation $\bar{A}$ indicates an input which is spoken of as the complement of A, or "not A." Further, since the OR and AND circuits employed in this invention have complementary outputs, that is two outputs, one carrying energy of positive polarity while the other is carrying energy of negative polarity, a bold line will be used to designate an "Up" or positive condition.

The invention is directed to a circuit having three stable states. In other words, the circuits respond stably to each of three successive pulses and produce an output in response to the third pulse. By way of explanation only, the driving pulses will be negative and designated by the letter $\bar{X}$.

Figure 1:
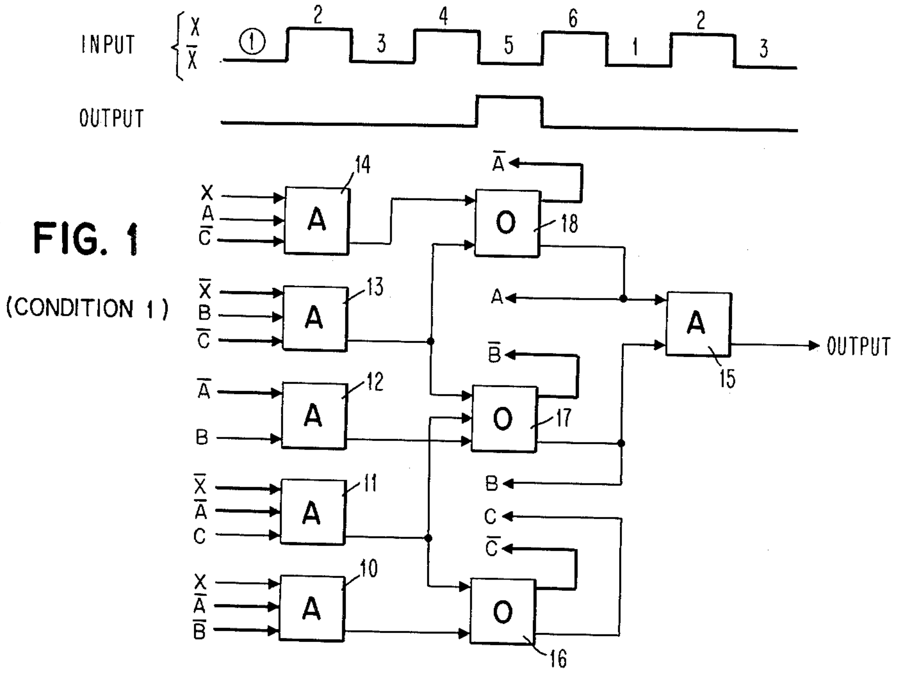

Referring now to FIG. 1, the trigger circuit is illustrated in the initial condition, or when a first driving pulse is applied to the input circuits. For ease in following the sequence of operation, a pulse chart is shown above the circuit diagram with an encircled number indicating the condition of the circuit. In other words, the first condition is produced by the negative pulse marked by the reference numeral 1.

The trigger circuit comprises a plurality of pulse input circuits, 10, 11, 12, 13 and 14 of the AND type. As is well known, in order for an AND type circuit to deliver an output, each of the inputs to the circuit must be applied coincidentally.

The output circuit of the trigger also comprises an AND circuit 15.

The output circuit is controlled by a plurality of intermediate control circuits 16, 17 and 18 coupled between the input and output circuits. The control circuits are of the OR type.

The input circuits comprise five in number, and constitute in effect three groups of input circuits for the three control circuits, respectively. In other words, OR circuit 16 is controlled by a first group of input circuits comprising AND blocks 10, 11. The second OR circuit 17 is controlled by a second group consisting of AND blocks 11, 12 and 13. The third OR circuit 18 is controlled by a third group of AND blocks 13 and 14. The driving pulses identified by $\bar{X}$ are applied to input circuits 11 and 13 while the pulse X (of opposite polarity) is applied to the input circuits 10 and 14. The remaining inputs to each of the circuits 10, 11, 13 and 14 are derived from the outputs of the OR circuits 16, 17 and 18. The outputs of the three OR circuits are identified by the letters A, B and C, and the complementary outputs are designated by the letters $\bar{A}$, $\bar{B}$ and $\bar{C}$. As can be seen in the drawing, the input circuit 12 is controlled completely by the feedbacks $\bar{A}$, $\bar{B}$ from the OR circuits 17, 18.

Before discussing the detailed operation of the circuits, it is also significant to note that the output circuit 15 is coupled to the outputs of the two latter OR circuits in the chain 17 and 18 and, therefore, an output is produced only upon coincidental operation of both of these OR circuits.

The initial condition of the circuits is as shown in FIG. 1. A negative driving pulse is applied to the circuits 11 and 13, as indicated by the bold line. Since no one of the AND circuits is operated by the application of the initial driving pulse, the condition of the OR circuits 16, 17 and 18 remains unchanged.

Upon termination of the first driving pulse, "Condition

Figure 2:
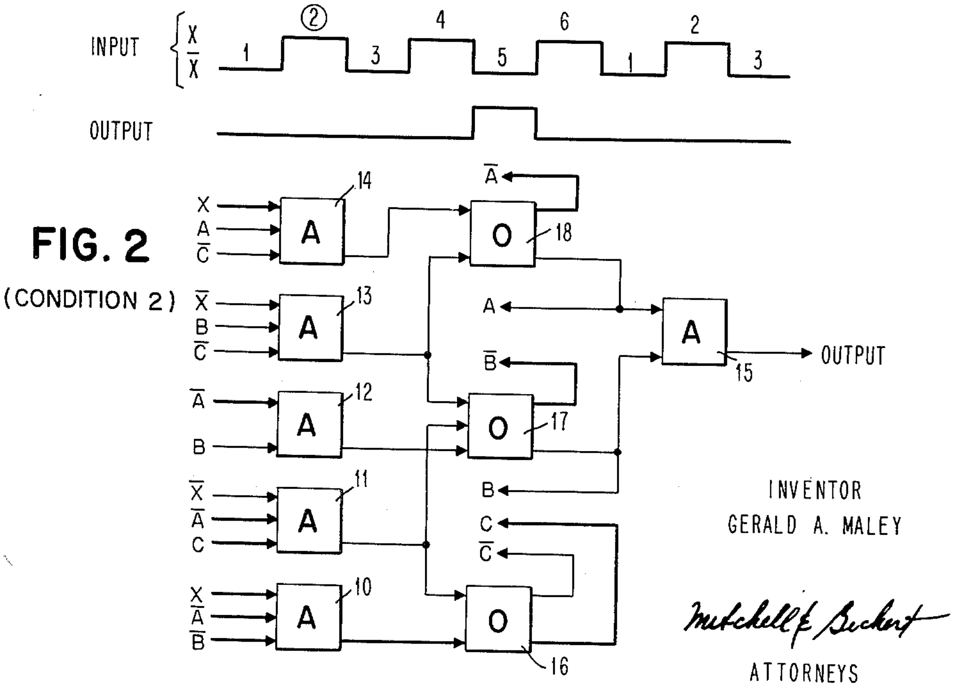

2" prevails (FIG. 2), and the input $\overline{X}$ goes Down and the input X goes Up or becomes positive. The conditions for operating the first input circuit 10 are now satisfied and it delivers an output to the first OR circuit 16. The OR circuit 16 responds by changing the polarity of its outputs so that the feedback $\overline{C}$ goes negative and C goes positive. As can be seen in FIG. 2, the feedback C is applied to the second input circuit 11 and conditions this circuit for operation upon the application of the next driving pulse.

Figure 3:
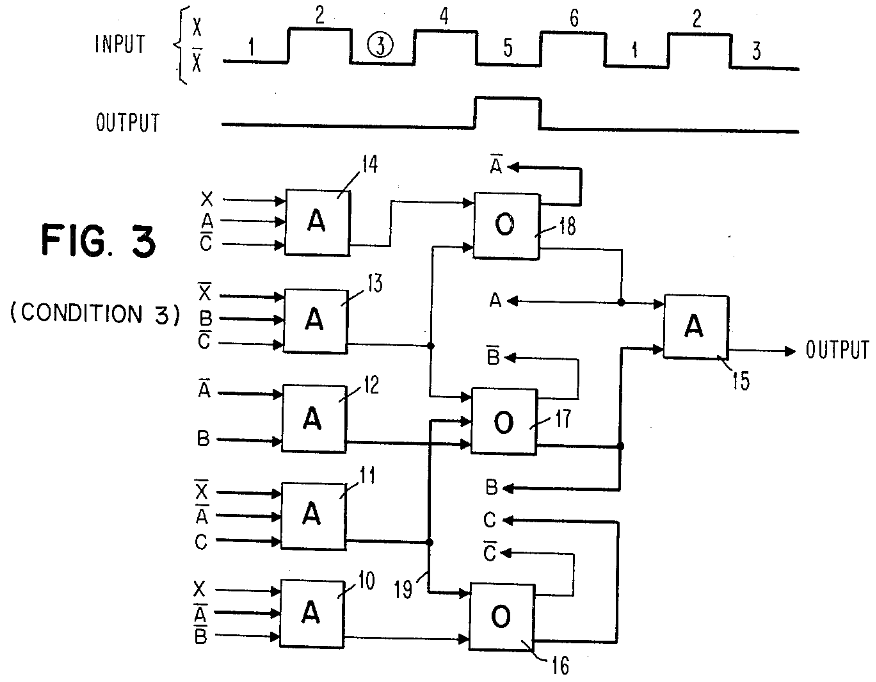

The condition produced by the application of the next driving input pulse is shown in FIG. 3, which illustrates the third condition of the circuit. As can be seen, the input $\overline{X}$ to circuits 11 and 13 goes positive and the input to 10 and 14 goes negative. The conditions for operating circuit 11 have now be satisfied, and accordingly an input over line 13 is applied to the first OR circuit 16 so as to maintain a positive feedback on the line C. The line 19, being multiplied to the OR circuit 17, delivers an input to this circuit and causes a reversal of the polarity of the outputs on the feedback lines B and $\overline{B}$. The feedback connection B is applied to the third input circuit 12, causing the circuit to operate. Thus, circuits 11 and 12 are rendered effective by application of the second input pulse.

Figure 4:
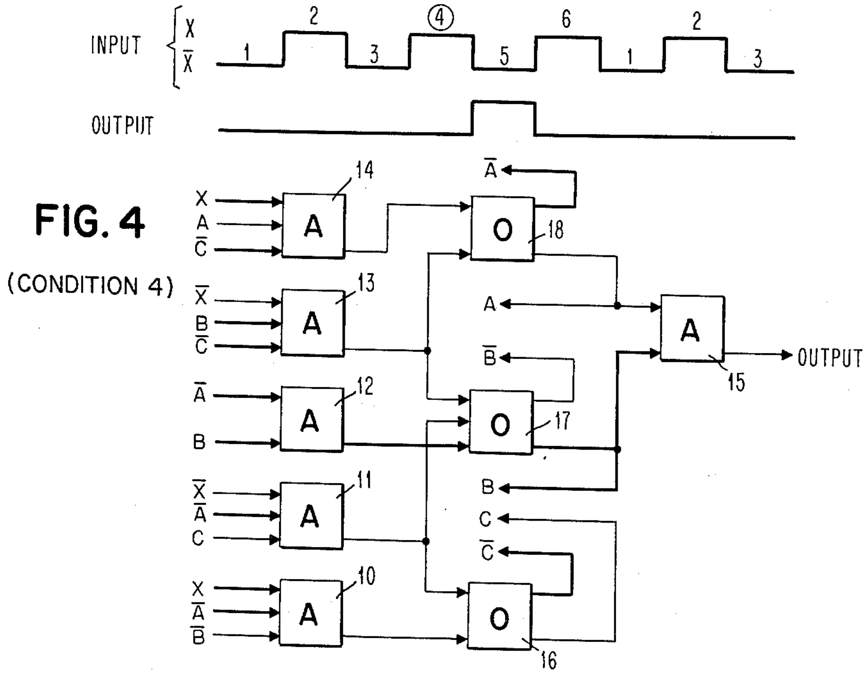
Figure 5:
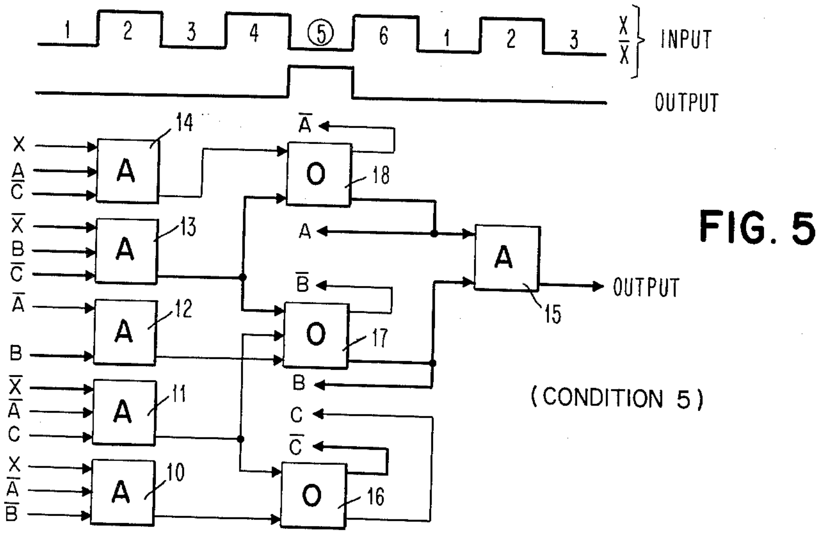

Upon termination of the second driving pulse, "Condition 4," as shown in FIG. 4, prevails. Accordingly, the input $\overline{X}$ goes Down and the input X goes Up. The input $\overline{X}$ being removed from the circuit 11 serves to remove an input necessary to maintain the first OR circuit 16 in operation. Circuit 16, therefore, returns to its original condition and the polarity of its feedback returns to its initial condition, whereby a positive feedback is now applied to the input circuit 13, conditioning this circuit for operation upon the application of the next input pulse. As can be seen, the conditions for operating input circuit 12 have not been altered and, therefore, an input to the OR circuit 17 is maintained and the polarity of the feedback B, $\overline{B}$ is also maintained; the feedback B also conditioning the circuit 13.

Upon application of the third driving pulse designated by the numeral 5, corresponding to "Condition 5" (FIG. 5), circuit 13 is rendered operating and delivers an input to the second and third OR circuits 17, 18, causing the OR circuit 18 to deliver an output to the circuit 15, whereby the conditions for operating circuit 15 have now been satisfied and an output is produced. Operation of the OR circuit 18 causes a change in polarity of its feedback output, so that the feedback $\overline{A}$ applied to the circuit 10 is Down and the feedback A conditions circuit 14 for operation upon the termination of the driving input $\overline{X}$.

The cycle of operation is completed, as shown in FIG. 6, by the termination of the third pulse or the application of the input X to the circuit 14. The conditions for operating circuit 14 are not satisfied and an input to the OR circuit 18 is maintained, thereby maintaining the feedback polarity as indicated. That is, the feedback $\overline{A}$ is now Down so as to prevent the first input circuit 10 from operating. The feedback $\overline{A}$, however, being removed from the input circuit 12, causes the second OR circuit 17 to become ineffective and the output from circuit 15 is terminated. The cycle may be repeated by the application of three additional pulses to the input circuit.

FIG. 7 illustrates graphically the condition of the feedback lines, the X input and the driving input, resulting in an output pulse upon the application of the third driving input pulse $\overline{X}$.

While the foregoing description sets forth the principles of the invention in connection with specific circuitry, it is to be clearly understood that this description is made only by way of example and not as a limitation of the scope of the invention as set forth in the objects thereof and in the accompanying claims.

What is claimed is:

1. A pulse-operated circuit system comprising a plurality of pulse input circuits each having a plurality of input terminals and one output terminal, a plurality of intermediate control circuits each having a plurality of input terminals and two output terminals, the input terminals of said intermediate control circuits being coupled to output terminals of said input circuits and the output terminals of said intermediate control circuits being coupled back to input terminals of said pulse input circuits, an output circuit having a plurality of input terminals and an output terminal, the input terminals of said output circuit being coupled to output terminals of said intermediate control circuits, said input circuits being adapted to receive a pulse input signal, and said intermediate control circuits being responsive to applied pulses for selectively conditioning the input circuits for further response to applied pulses and for actuating the output circuit upon application of a predetermined number of pulses to the input circuits.

2. The system according to claim 1, wherein said input and output circuits comprise logical AND circuit blocks, and said control circuits comprise logical OR circuit blocks, and wherein said input circuits are adapted to receive a pulse input signal comprising a pulse input and the complement thereof, and wherein said output circuit is adapted to produce a pulse output signal when actuated by said intermediate control circuits.

3. The system according to claim 1, wherein each of said control circuits is coupled to predetermined groups of said input circuits and is operable in response to an output from any one circuit in the associated group, and wherein said output circuit is coupled to a predetermined group of said control circuits and is operable in response to simultaneous outputs from all of said control circuits in said latter-mentioned group, and wherein said control circuits in said latter mentioned group being adapted to be operated simultaneously upon application of said predetermined number of pulses to said input circuits.

4. A tri-stable circuit system adapted to produce an output in response to three input pulses, comprising first, second and third OR type circuits, a plurality of groups of input circuits respectively connected to said OR circuits, whereby an output from any circuit in a group is capable of operating the associated OR circuit, feedback connections from said OR circuits to said input circuits and input connections to certain of said input circuits, said feedback and input connections being arranged to cause said groups to deliver sequential outputs to said first, second and third OR circuits in response to three successive input pulses, and an AND type output circuit coupled to said second and third OR circuits, whereby an output is produced in response to three input pulses.

5. The system according to claim 4, wherein said input circuits comprise, first and second AND circuits coupled to said first OR circuit, second, third and fourth AND circuits coupled to said second OR circuit, and fourth and fifth AND circuits coupled to said third OR circuit; the initial condition of said input circuits being such that no output is delivered to any of said OR circuits and the feedback connections from said second and third OR circuits conditioning said first AND circuits for operation upon the application of a pulse thereto.

6. The system according to claim 5, wherein each of said OR circuits comprises two feedback connections for supplying energy of opposite polarities, the polarities being reversed when the condition of the OR circuit is reversed; and said first OR circuit having normally an ineffective feedback connection to said second AND circuit, whereby in response to an output from said first AND circuit said first OR circuit reverses the polarity of its feedback energy and conditions said second AND circuit for operation upon application of the next succeeding pulse thereto.

7. The system according to claim 6, wherein said second OR circuit comprises feedback connections to said third and fourth AND circuits, and in response to an output from said second AND circuit renders said third AND circuit operating and conditions said fourth AND circuit for operation upon the application of the next input pulse.

8. The system according to claim 7, wherein said first OR circuit comprises feedback connections to said first and fifth AND circuits and in response to an output from said fourth AND circuit produces an output simultaneously with said second OR circuit to operate said AND type output circuit.

References Cited in the file of this patent

UNITED STATES PATENTS 2,926,850 Richards ---------------- Mar. 1, 1960

OTHER REFERENCES

Textbook, "Digital Computer Components and Circuits," R. K. Richards, D. Van Nostrand Co., 1957, pp. 118–121.